United States Patent [19]

Bartholic et al.

[11] Patent Number: 4,851,108
[45] Date of Patent: Jul. 25, 1989

[54] HYDROCARBON CONVERSION-REGENERATION PROCESS USING DILUTE AND DENSE BEDS

[75] Inventors: David B. Bartholic, Watchung; Dwight F. Barger, High Bridge, both of N.J.

[73] Assignee: Engelhard Corporation, Edison, N.J.

[21] Appl. No.: 804,871

[22] Filed: Dec. 5, 1985

[51] Int. Cl.⁴ .................. C10G 9/32; C10G 11/18
[52] U.S. Cl. .................... 208/127; 208/161; 208/164; 502/41
[58] Field of Search ............. 208/113, 120, 127, 164

[56] References Cited

U.S. PATENT DOCUMENTS

| | | | |
|---|---|---|---|
| 2,253,486 | 8/1941 | Belchetz | 208/153 |
| 2,353,505 | 7/1944 | Scheineman | 208/163 |
| 2,374,073 | 4/1945 | Belchetz | 208/162 |
| 2,389,236 | 11/1945 | Payne | 502/44 X |
| 2,424,147 | 7/1947 | Campbell | 502/41 |
| 2,427,820 | 9/1947 | Thomas | 208/157 |
| 2,929,774 | 3/1960 | Smith | 208/113 |
| 3,074,878 | 1/1963 | Pappas | 208/127 |
| 3,294,675 | 12/1966 | Adams et al. | 208/152 |
| 3,353,925 | 11/1967 | Baumann et al. | 208/164 |
| 4,026,789 | 5/1977 | James | 208/74 |
| 4,318,800 | 3/1982 | Woebcke et al. | 208/127 |
| 4,419,221 | 12/1983 | Castagnos et al. | 208/113 |
| 4,478,708 | 10/1984 | Farnsworth | 208/161 |
| 4,495,063 | 1/1985 | Walters et al. | 208/113 |

FOREIGN PATENT DOCUMENTS 0138783 4/1985 European Pat. Off. .
1542521 3/1970 Fed. Rep. of Germany .

OTHER PUBLICATIONS

Petroleum Processing, Hengstebeck McGraw Hill (1959) pp. 151-152.

Primary Examiner—Olik Chaudhuri
Attorney, Agent, or Firm—Inez L. Moselle

[57] ABSTRACT

An improved hydrocarbon conversion process is disclosed of the type employing circulating solids between a reactor (contactor) and regenerator (combustor). The entire process is in the dilute phase and is characterized by all the catalyst passing through the cyclones and never returning to a dense bed in either the reactor or regenerator.

5 Claims, 1 Drawing Sheet

HYDROCARBON CONVERSION-REGENERATION PROCESS USING DILUTE AND DENSE BEDS

BACKGROUND OF THE INVENTION

This invention relates to a process for converting heavy hydrocarbon oils into lighter fractions, including processes for converting heavy hydrocarbons containing high concentrations of coke precursors and heavy metals into gasoline and other liquid hydrocarbons. In the most preferred embodiment this invention is directed towards the fluid catalytic cracking of hydrocarbons to obtain products boiling in the motor fuel range.

DESCRIPTION OF THE PRIOR ART

The fluid catalytic cracking process, with the advent of the highly active zeolitic type catalysts, has evolved into the generally standardized practice of effecting essentially cocurrent ascending flow of hydrocarbon vapors and the finely divided catalyst in an elongated tubular reaction zone referred to in the industry as a riser. Notwithstanding the brevity of the reaction cycle, which is usually in the order of about 10 seconds or less, there is a laying down of coke on the catalyst thereby adversely affecting its activity as well as undesirably altering product yield distribution upon reuse. Accordingly, it is the universally observed procedure to separate the catalyst from the riser effluent and recycle to the process via a regenerator which serves the dual purpose of combusting the coke contaminants and heating the catalyst for reuse in the reaction cycle.

In accordance with the prior art, separation of the catalyst from the cracked hydrocarbons is carried out within a so-called disengaging chamber which contains a stripping zone. The disengaging chamber is a contained vessel either forming a relatively voluminous shroud about the downstream extremity portion of the riser or externally positioned and axially aligned therewith. In the latter type arrangement, the fluid stream of catalyst and converted hydrocarbons is discharged into the disengaging chamber directly from the riser via a sidewise opening or port. In said shroud-type arrangement, however, it is generally preferred to pass the riser effluent from said sidewise opening or port firstly through a singlestage cyclone vented to the disengaging chamber. Due to the substantial reduction of the superficial space velocity experienced in the disengaging chamber in either of said modes of operation, a considerable portion of catalyst entrained in the riser effluent settles out and collects at the bottom of the chamber. The gas stream along with the stripping vapor thereupon is vented to the fractionator from disengaging chamber via a cyclonic separator positioned therein serving to collect predominantly all of the entrained catalyst.

In light of the fact that the modern zeolitic cracking catalysts range in particle size from about 5 to 100 microns with the major portion thereof being in the order of from about 40 to 80 microns, separation thereof as practiced in accordance with the aforesaid prior art is nonetheless remarkably efficient. However the relatively small amount of catalyst entrained in the cracked stream poses a problem because of the tremendous cumulative throughput thereof. The foremost problem is that the entrained catayst leaving with the cracked stream must be recycled thereto in the form of a slurry oil recovered from the fractionator thereby reducing the amount of feedstock that can be accommodated in the cracking unit. Thus, optimal processing efficiency of the cracker is sacrificed.

Additionally, there has always been a need in the prior art to affect rapid disengagement of the catalyst from reaction products in order to minimize undesirable reactions which can take place thereby detracting from the overall efficiency of the process when considered as a whole.

As can well be appreciated by those skilled in the art, a necessary and integral part of a fluid catalytic cracking reactor involves the regenerator wherein the spent catalyst has its activity restored. Regeneration of spent catalyst is generally effected after separation of the spent catalyst from the reaction products. The spent catalyst is removed from the reaction zone and contacted in a stripping zone with a stripping medium, usually steam, to remove vaporized and entrained and/or occluded hydrocarbons from the catalyst. From the stripping zone, a stripped catalyst is passed into a regeneration zone wherein the stripped spent catalyst is regenerated by burning coke deposits therefrom with an oxygen-containing gas, usually air. The resulting hot regenerated catalyst from the regeneration zone is then recycled to the reaction zone in contact with additional hydrocarbon feed.

SUMMARY OF THE INVENTION

The novel process of this invention employs novel controls on both the reactor (contactor) and the regenerator (combustor) so that there is complete control of the circulating solid material. In the first place, when the circulating material is in contact with combustion products (regenerator/combustor) or hydrocarbon vapors (reactor/contactor) it is in a dilute phase. After separation of the circulating material from the vapors or combustion products, the material is returned to a different vessel. The vast majority of other technology employed has a dense bed in contact with products of combustion or hydrocarbon vapors and utilizes cyclones to return the circulating material to the same vessel from which it came. This vessel always contains a dense bed of circulating material. In the novel process of this invention, the dilute phase system is connected directly to a preseparator and then to high efficiency cyclones such as multicyclones so that the circulating material is always discharged into another vessel separate from the vapors. This circulating material forms a dense bed in the secondary vessel, the secondary vessel being neither the reactor or the regenerator. The novel process of the instant invention is characterized by being a completely balanced system in that the separation efficiency is the same for both the reactor/contactor and the regenerator/combustor so that the two systems will retain the same particle size range. In the novel process of this invention, all the catalyst entering the reactor and regenerator is maintained in a dilute phase and passes through the preseparator, i.e., there is no dense fluid bed in either the reactor or regenerator. The novel process of this invention provides flexibility with respect to hydrocarbon feedstock composition, product distribution throughput and capacity. The novel process of this invention also results in more fines retention which will result in lower average particle size, more surface area, higher activity maintenance, and better fluidization properties. Further features and advantages of the process of this invention would be apparent from a detailed description of the preferred embodiment of the process as applied to the catalytic cracking of hydrocarbons.

BRIEF DESCRIPTION OF THE FIGURE

With reference to FIG. 1 illustrating a preferred embodiment of the catalytic cracking system of this invention, the system comprises a fast fluid type system that essentially operates in the dilute phase with all of the material transported from the bottom of the regenerator (B) to the top. The difference in this system when compared with conventional systems is (1) complete control of all catalyst flow into the system and (2) all the catalyst that flows into the system is transported by the air and eventually by the products of combustion through the regenerator to the cyclones (E) and (F). In this way, control is had not only of the total flow rate of air and combustion products but also the catalyst loading to the cyclone systems (E) and (F). The control of the catalyst allows control of pounds per cubic foot of catalyst entering the cyclones (E) and (F) and therefore gives control of the loading to the cyclone so that the system is not overloaded. Thus, air from a blower enters through line (A) and through the bottom of regenerator (B) containing catalyst to be regenerated and the flow rate is controlled to maintain a dilute phase. The catalyst and vapors are rapidly separated in preseparator (E) at a efficiency greater than 80% and the catalyst material passes through the bottom of preseparator (E) through line (R) into the regenerator surge hopper (C). Vapor materials exit (E) and pass into multicyclones (F) wherein flue gas is removed through line (G) and catalyst again passes through line (R) into regenerator surge hopper (C). The regenerator system is obviously built to burn off all the carbon from the spent catalyst. Therefore, this system is designed for certain temperature, pressure, and flow rate so that one can obtain the carbon burning in the desired time. The products of combustion from the regenerator that exit through flue gas line (G) are mainly nitrogen, $CO_2$, with a small amount of CO, i.e., less than 500 parts per million normally, $SO_x$ which is dependent on the amount of sulfur from the coke which is related to the amount of sulfur in the feed, water vapor contained in the combustion air and water vapor produced by the combustion reaction. There is a small amount of $NO_x$ produced that is strictly based on the temperature of operation of the regenerator (B). Most of the nitrogen in the coke that is related to the nitrogen in the feed is liberated either as ammonia or as nitrogen. This system can also be operated to leave carbon on the regenerated catalyst by limiting the air to the regenerator. This may result in higher CO levels in the flue gas. The amount of CO will depend on the regenerator temperature, carbon level on regenerated material and oxygen supplied for combustion.

Since the spent catalyst is relatively cool, i.e., between 800° F. and 1100° F., the burning of carbon from this material is difficult at the time frame usually employed for the dilute phase burning in the regenerator, i.e. 3 to 15 seconds. For this reason, a hot recirculation valve (O) is provided that circulates back hot material from the regenerator surge hopper (C) back to the base of regenerator (B). The purpose of this line is to control the temperature in regenerator (B) so that the carbon or coke can be burned off the spent catalyst in the time allowed in the dilute phase transport riser regenerator. Typically, the ratio of the circulation rate through valve (O) and the circulation rate through spent slide valve (JJ) is at least 1:1 and in many cases will be 2:1 or greater so that the temperature in this system can be raised to that in which burning can take place completely to $CO_2$ and all the carbon burned off the catalyst. FIG. 1 also includes a preferred, though not an essential, embodiment of the novel process of the invention, namely catalyst cooler (N) whose flow rate is controlled by slide valve (P). This valve is used when the regenerator temperature reaches its maximum metallurgical limits in order to protect the equipment against excessive damages. In other words, if the regenerator system is designed for a temperature of about 1600° F., when the temperature in the system approaches that temperature the flow would be started through slide valve (P) which would move more material from regenerator surge hopper (C) through the catalyst cooler (N) and through the valve (P). As is obvious, this works opposite of valve (O) in that it would be removing heat by generating steam in the catalyst cooler (N) and therefore lower the overall system temperature in the regenerator.

Figure 1:
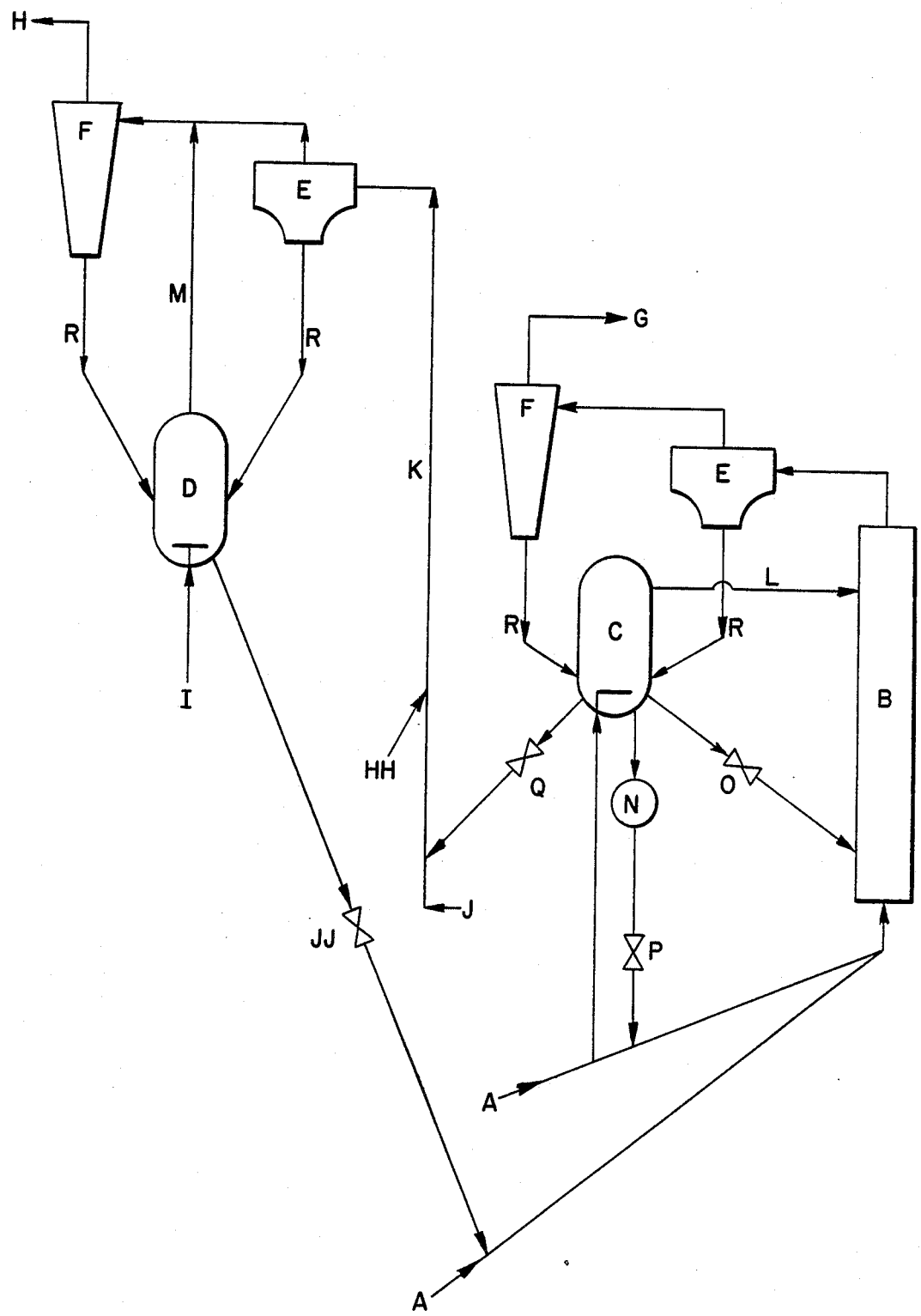
FIG. 1 is a diagrammatic representation of a preferred form of apparatus of the present invention which is suitable for carrying out the process of this invention.

As can well be appreciated, both control valves (P) and (O) can be used. If one wishes to produce steam in order to supply energy to a refinery, valve (P) can be used continually in the open mode to generate a constant amount of steam. There may also be reasons to operate at cooler temperatures in the regenerator because of catalyst to oil relationships in the reactor or contactor (K) or due to the desired reaction kinetics. As indicated earlier, at the top of transport riser regenerator (B) all of the catalyst and air used for combustion enters preseparator (E). Preseparator (E) is designed so that the minimum efficiency must be greater than 80% and preferably greater than 90% removal of the solids from the gas. The solids removed are discharged from separator (E) through regenerated solids line (R) to the regenerator surge hopper (C). This return of the material from the preseparator (E) to the surge hopper (C) is done at a level lower than the bed level in surge hopper (C) so that the pipe is submerged in an actual level to prevent back flow of gas up the pipe into preseparator (E) causing preseparator (E) to malfunction. The flue gas that exits preseparator (E) has only 20% or less of the catalyst with which it came into preseparator (E) and it flows out to the high efficiency cyclone system (F) for final clean up. The total clean up in this system is greater than 99.0%, and preferably greater than 99.99%, and the essentially catalyst-free gas exits high efficiency cyclone (F) through line (G) to flue gas treating and/or the atmosphere. The catalyst that is separated in high efficiency cyclone (F) is returned to the regenerator surge hopper (C) again below the normal level of catalyst so that this dipleg is sealed.

The regenerator surge hopper (C) is fluidized by controlling a small amount of air from the air blower into the system through an air distributor so that the material is maintained at at least the velocity of one-half foot a second but no greater than 3.3 ft. a second in the vessel. The gas carrying some catalyst exits through regenerator hopper (C) through line (L) which is connected back to the regenerator (B). Line (L), the surge hopper vent, is also an equalizing line and is a very key feature of this process. This line assures that the pressure at the inlet to preseparator (E) and the pressure on surge hopper (C) are equal so at no time can surge hopper (C) be at a much higher pressure than preseparator (E). If the surge hopper (C) were at a higher pressure than preseparator (E) then it would be possible that the material that was separated in preseparator (E) could not flow down pipe (R) into the surge hopper and therefore cause preseparator (E) not to function. The same pressure differential or equalization is necessary from high efficiency cyclone (F) to surge hopper (C). Surge hopper (C) can be at a slightly higher pressure than either (E) or (F) as long as the level in the return pipes (R) is not high enough to cause preseparator (E) and high efficiency cyclone (F) to malfunction. The vent line (L) is shown connected to the dilute phase regenerator (B). However, the vent line (L) from the regenerator inventory surge hopper (C) could also be placed between (E) and (F) and that choice depends on the velocity component in regenerator surge hopper (C). In any event, the purpose of vent line (L) is to insure that the pressure at inlet to preseparator (E) and the pressure on surge hopper (C) are equal.

Similar considerations apply to reactor/contactor (K) through which is introduced lift steam through line (J) and hot regenerated catalyst through slide valve (Q) and feed through line (HH) and the products and catalyst again empty into preseparator (E) and then into (F) in the same manner as has been previously described with respect to regenerator (B). It is noted that it is also essential that there be an equalizer line (M) from the catalyst stripper (D) back to the cyclones (E) and (F) in the identical same manner as there is between regenerator inventory surge hopper (C) and regenerator (B). Therefore line (M) in the drawing performs the same function as line (L). Typically, the operating parameters for regenerator (B) will be between 1100° F. and 2000° F. and for FCC operations less than 1400° F. The velocity must be greater than 3½ ft. per second in order to assure a dilute phase operation and less than 100 ft. per second and usually will be maintained in the range of 5-15 ft. per second. The pressure on the regenerator will typically be between 5 and 50 psig, preferably between 10 and 30 psig and gas time will typically be between 3 and 15 seconds.

The reactor system design is very similar to that of the regenerator in FIG. 1 in that it also consists of a two separator system (E) and (F) and a surge hopper (D) as well as a riser/contactor (K). The regenerated catalyst is taken from the regenerator surge hopper (C) through valve (Q) into the riser contactor (K). It can be contacted with an diluent such as lift gas, steam, hydrocarbon recycle, or water, or be fed through line (J). There are also provisions (HH) for an optional feed point to control the time in the contactor or reactor. The regenerated catalyst plus any diluent plus any recycle plus feed is contacted in contactor/reactor (K) for a period of time necessary to obtain the desired yield as either an FCC, heavy oil type FCC, fluid coker or as in an ART process, such as that disclosed in U.S. Pat. No. 4,263,128, which is herein incorporated by reference. Again, all of the catalyst as well as all of the vapors produced in reactor/contactor (K) enter into preseparator (E). As in like manner with regenerator (B), the catalyst and vapors to preseparator (E) are controlled so that the system is not overloaded. The efficiencies of separators (E) and (F) are as discussed on the regenerator system and again the catalyst separated from the vapors is returned through lines (R) below the dense bed level to spent catalyst stripper (D). The spent catalyst stripper (D) is fluidized with steam to the stripper.

The vent line (M) from stripper (D) enters between the separators (E) and (F). Since the amount of entrained material will be quite low, it could just as easily enter into the inlet to (E) as in the regenerator.

The spent catalyst then leaves the catalyst stripper on level control through valve (JJ). The vapors now essentially free of catalyst leave the system through line (H) to fractionation and to separation. In the case of an ART unit they could be quenched at this point. In the case of a fluid coker, FCC or heavy oil FCC, the vapors would go into the fractionation system and may or may not be quenched.

From the above description it should be noted that one of the main differences between the system set forth in FIG. 1 and the system of the prior art is that none of the vapors from regeneration system (B) or the contactor (K) are in equilibrium or contact with the catalyst dense bed that would be contained in vessels (C) or (D). Most systems up to this point have a feature where the vapors are separated in the vessel and are in constant contact with the dense bed.

The contactor (K) conditions are basically between 10 and 100 ft. per second and preferably running at an outlet velocity of about 70 ft. per second. The time depends on whether there is an ART unit; as an ART unit, the time would be preferably less than a second, and normally less than 3 seconds, or as an FCC, which normally operates between 1 second and 5 seconds vapor time. The temperature in the contactor would range between 800° and 1000° F.

The preseparator (E) is not narrowly critical and all that is required is that there be a very rapid disengagement of circulating solids and vapors. Materials of this type are disclosed in U.S. Pat. Nos. 4,285,706; 4,348,215; and 4,398,932, the entire disclosures of which are herein incorporated by reference. The high efficiency cyclone (F) is a conventional type cyclone as to be understood that it can be one or a plurality of cyclones. Preferred separation (F) is of the multicyclone type, described in U.S. Pat. No. 4,285,706, the disclosure of which is incorporated herein.

One skilled in the art of fluidized solid handling would quickly realize the potential of this system to reduce capital costs associated with the installation of this equipment as well as its potential to increase (double) the capacity of existing FCC, heavy oil FCC, fluid coker or ART process units using the existing vessels without major modifications since this system eliminates superficial velocity constraints now in existence with dense bed type regenerators. Also, this fluidized apparatus design concept is applicable to other fluidizable solids systems which have heretofore been limited by superficial bed velocities.

It is understood that the particular fluidized solid or solids obviously depends on the particular process being carried out.

Typical solids for cracking include those which have pore structures into which molecules of feed material may enter for adsorption and/or for contact with active catalytic sites within or adjacent to the pores. Various types of catalysts are available within this classification, including for example the layered silicates, e.g. smectites. Although the most widely available catalysts within this classification are the well-known zeolite-containing catalysts, non-zeolite catalysts are also contemplated.

The preferred zeolite-containing catalysts may include any zeolite, whether natural, semi-synthetic or synthetic, alone or in admixture with other materials which do not significantly impair the suitability of the catalyst, provided the resultant catalyst has the activity and pore structure referred to above. For example, if the virgin catalyst is a mixture, it may include the zeolite component associated with or dispersed in a porous refractory inorganic oxide carrier, in such case the catalyst may for example contain about 1% to about 60%, more preferably about 15 to about 50%, and most typically about 20 to about 45% by weight, based on the total weight of catalyst (water free basis) of the zeolite, the balance of the catalyst being the porous refractory inorganic oxide alone or in combination with any of the known adjuvants for promoting or suppressing various desired and undesired reactions. For a general explanation of the genus of zeolite, molecular sieve catalysts useful in the invention, attention is drawn to the disclosures of the articles entitled "Refinery Catalysts Are a Fluid Business" and "Making Cat Crackers Work on Varied Diet", appearing respectively in the July 26, 1978 and Sept. 13, 1978 issues of Chemical Week magazine. The descriptions of the aforementioned publications are incorporated herein by reference.

For the most part, the zeolite components of the zeolite-containing catalysts will be those which are known to be useful in FCC cracking processes. In general, these are crystalline aluminosilicates, typically made up of tetra coordinated aluminum atoms associated through oxygen atoms with adjacent silicon atoms in the crystal structure. However, the term "zeolite" as used in this disclosure contemplates not only aluminosilicates, but also substances in which the aluminum has been partly or wholly replaced, such as for instance by gallium, phosphorus, boron, iron, and/or other metal atoms, and further includes substances in which all or part of the silicon has been replaced, such as for instance by germanium or phosphorus, titanium and zirconium substitution may also be practiced.

Most zeolites are prepared or occur naturally in the sodium form, so that sodium cations are associated with the electronegative sites in the crystal structure. The sodium cations tend to make zeolites inactive and much less stable when exposed to hydrocarbon conversion conditions, particularly high temperatures. Accordingly, the zeolite may be ion exchanged, and where the zeolite is a component of a catalyst composition, such ion exchanging may occur before or after incorporation of the zeolite as a component of the composition. Suitable cations for replacement of sodium in the zeolite crystal structure include ammonium (decomposable to hydrogen), hydrogen, rare earth metals, alkaline earth metals, etc. Various suitable ion exchange procedures and cations which may be exchanged into the zeolite crystal structure are well known to those skilled in the art.

Examples of the naturally occurring crystalline aluminosilicate zeolites which may be used as or included in the catalyst for the present invention are faujasite, mordenite, clinoptilote, chabazite, analcite, crionite, as well as levynite, dachiardite, paulingite, noselite, ferriorite, heulandite, scolccite, stibite, harmotome, phillipsite, brewsterite, flarite, datolite, gmelinite, caumnite, leucite, lazurite, scaplite, mesolite, ptolite, nephline, matrolite, offretite and sodalite.

Examples of the synthetic crystalline aluminosilicate zeolites which are useful as or in the catalyst for carrying out the present invention are Zeolite X, U.S. Pat. Nos. 2,882,244; Zeolite Y, 3,130,007; and Zeolite A, 2,882,243; as well as Zeolite B, 3,008,803; Zeolite D. Canada Pat. Nos. 661,981; Zeolite E, 614,495; Zeolite F, U.S. Pat. Nos. 2,996,358; Zeolite H, 3,010,789; Zeolite J, 3,011,869; Zeolite L, Belgian Pat. No. 575,177; Zeolite M, U.S. Pat. Nos. 2,995,423; Zeolite O 3,140,252; Zeolite Q, 2,991,151; Zeolite S, 3,054,657; Zeolite T, 2,950,952; Zeolite W, 3,012,853; Zeolite Z, Canada Pat. Nos. 614,495; and Zeolite Omega, 817,915. Also ZK-4HJ, alpha beta and ZSM-type zeolites are useful. Moreover, the zeolites described in U.S. Pat. Nos. 3,140,249; 3,140,253; 3,944,482; and 4,137,151 are also useful, the disclosures of said patents being incorporated herein by reference.

The crystalline aluminosilicate zeolites having a faujasite-type crystal structure are particularly preferred for use in the present invention. This includes particularly natural faujasite and Zeolite X and Zeolite Y.

Typical solids for the ART process are those set forth in U.S. Pat. No. 4,263,128.

GLOSSARY FOR FIG. 1

A. Air Blower Discharge—Air to Regenerator System
B. Regenerator/Burner/Kiln
C. Regenerator/Surge Hopper
D. Spent Catalyst/ARTCAT Stripper
E. Preseparator
F. High Efficiency Cyclone
G. Flue Gas to Stack/Treating
H. Oil Vapors to Separation
I. Steam to Stripper
J. Lift Steam/Gas (Wet or Dry)/H$_2$O to Riser Contactor or Feed
K. Riser Contactor
L. Surge Hopper Vent
M. Stripper Vent
N. Catalyst Cooler/ARTCAT Cooler
O. Hot Recirculating Material Slide Value
P. Cold Recirculating Material Slide Valve
Q. Regenerated Material Slide Valve
R. Separated Material from Separators
JJ. Spent Slide Valve
HH. Feed—Optional Feed Point to Control Time in Contactor

What is claimed is:

1. In a hydrocarbon conversion process wherein a hydrocarbon feed is converted to lower boiling products in a reactor by contacting the same at elevated temperataures with fluid solid material to form said lower boiling products wherein spent solid material containing coke from said reactor is separated from reaction products and stripped of volatile hydrocarbons in a stripping zone, stripped solid material is regenerated with an oxygen-containing gas in a regeneration zone and hot freshly regenerated fluid solid material returned to the reactor, the improvement which comprises carrying out both said conversion and said regeneration at gas velocities greater than 3½ ft. per second sufficient to achieve a dilute phase entrained solids zone, passing the solid material and gases from both said reactor and regeneration zone through cyclone preseparators for rapid disengagement and removal of greater than 80% solids from gases and returning the solid material without vapors to a dense bed contained in a vessel other than said regenerator or reactor, the pressure at the inlet to said preseparators being substantially the same as the pressure in the vessel containing the dense bed of solid material.

2. The process of claim 1 wherein said solid is a catalyst.

3. The process of claim 2 wherein the said catalytic material comprises a crystalline aluminosilicate zeolite.

4. The process of claim 1 wherein the efficiency of said preseparator is at least 90%.

5. The process of claim 4 wherein the gaseous effluents from each preparation is passed to a high efficiency cyclone for further disengagement of solids and gases and the separation efficiencies of each separation and high efficiency cyclone system is greater than 99.99%.

* * * * *